US009014414B2

(12) United States Patent
Katano et al.

(10) Patent No.: US 9,014,414 B2
(45) Date of Patent: Apr. 21, 2015

(54) INFORMATION PROCESSING APPARATUS AND INFORMATION PROCESSING METHOD FOR PROCESSING IMAGE INFORMATION AT AN ARBITRARY VIEWPOINT IN A PHYSICAL SPACE OR VIRTUAL SPACE

(75) Inventors: Yasuo Katano, Kawasaki (JP); Masahiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1029 days.

(21) Appl. No.: 12/509,840

(22) Filed: Jul. 27, 2009

(65) Prior Publication Data

US 2010/0027888 A1 Feb. 4, 2010

(30) Foreign Application Priority Data

Jul. 29, 2008 (JP) ................. 2008-195311

(51) Int. Cl.
*G06K 9/00* (2006.01)
*G06T 19/00* (2011.01)

(52) U.S. Cl.
CPC ............... *G06T 19/00* (2013.01); *G06T 19/006* (2013.01)

(58) Field of Classification Search
USPC ......... 382/100, 154, 173, 276, 282, 294, 302; 345/419, 427
See application file for complete search history.

(56) References Cited

U.S. PATENT DOCUMENTS

| | | | | |
|---|---|---|---|---|
| 6,069,608 A * | 5/2000 | Izumi et al. | ................... | 345/619 |
| 6,157,733 A * | 12/2000 | Swain | .......................... | 382/154 |
| 6,657,637 B1 * | 12/2003 | Inagaki et al. | ................ | 345/629 |
| 6,822,643 B2 * | 11/2004 | Matsui et al. | .................. | 345/204 |
| 6,903,746 B2 * | 6/2005 | Fukushima et al. | .......... | 345/582 |
| 7,084,887 B1 * | 8/2006 | Sato et al. | ...................... | 382/154 |
| 7,312,795 B2 * | 12/2007 | Aso et al. | ....................... | 382/154 |
| 7,542,033 B2 * | 6/2009 | Kawakami et al. | ........... | 345/419 |
| 7,773,769 B2 * | 8/2010 | Rattan et al. | .................. | 382/100 |
| 8,072,470 B2 * | 12/2011 | Marks | ........................... | 345/632 |
| 2001/0022586 A1 * | 9/2001 | Hino et al. | ..................... | 345/473 |
| 2001/0024206 A1 * | 9/2001 | Kobayashi | .................... | 345/582 |
| 2004/0056870 A1 * | 3/2004 | Shimoyama et al. | ......... | 345/629 |
| 2005/0069223 A1 * | 3/2005 | Tanimura et al. | ............. | 382/173 |
| 2005/0073531 A1 * | 4/2005 | Kuroki et al. | .................. | 345/633 |
| 2005/0179617 A1 * | 8/2005 | Matsui et al. | ...................... | 345/7 |
| 2006/0221098 A1 * | 10/2006 | Matsui et al. | ................. | 345/633 |
| 2007/0002037 A1 * | 1/2007 | Kuroki et al. | .................. | 345/418 |
| 2007/0268316 A1 * | 11/2007 | Kajita et al. | ................... | 345/642 |

(Continued)

FOREIGN PATENT DOCUMENTS

| | | | |
|---|---|---|---|
| JP | 2000-322601 A | 11/2000 |
| JP | 2001-319244 A | 11/2001 |

(Continued)

*Primary Examiner* — Eric Rush
(74) *Attorney, Agent, or Firm* — Canon U.S.A., Inc. IP Division

(57) ABSTRACT

An information processing apparatus configured to generate an MR image displayed on a display apparatus includes a segmentation unit configured to segment the generated MR image into a plurality of regions, a generation unit configured to generate a pattern image to be superimposed on one of the plurality of segmented regions or each of the plurality of segmented regions, a superimposition unit configured to superimpose the generated pattern image on one of the plurality of segmented regions or each of the plurality of segmented regions, and an output unit configured to output the MR image, including the pattern image superimposed thereon, to the display apparatus.

12 Claims, 15 Drawing Sheets

(56) References Cited

U.S. PATENT DOCUMENTS

2008/0204361 A1* 8/2008 Scales et al. .................. 345/8
2008/0211813 A1* 9/2008 Jamwal et al. ............... 345/426

FOREIGN PATENT DOCUMENTS

| JP | 2002-197486 A | 7/2002 |
| JP | 2006-252426 A | 9/2006 |

* cited by examiner

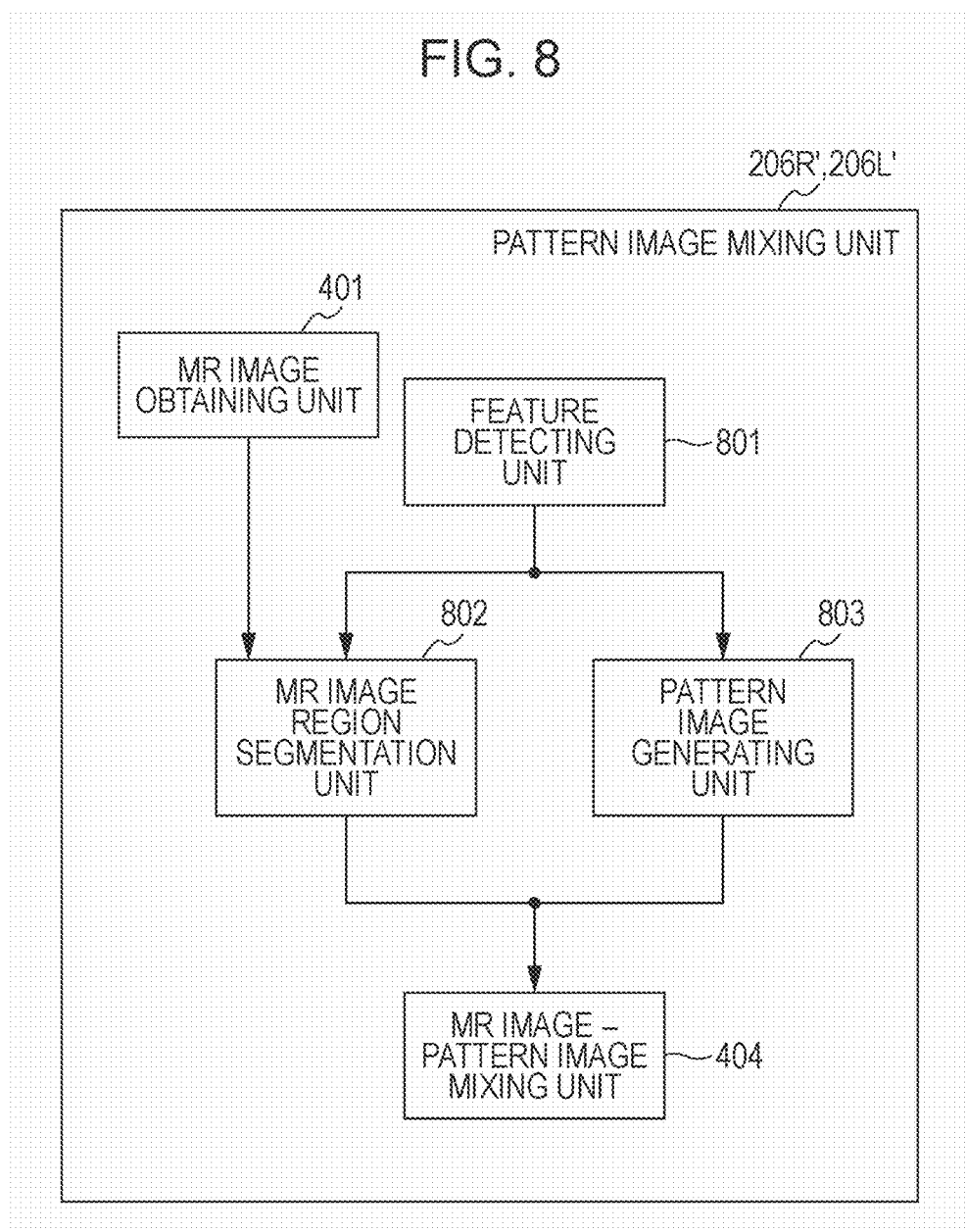

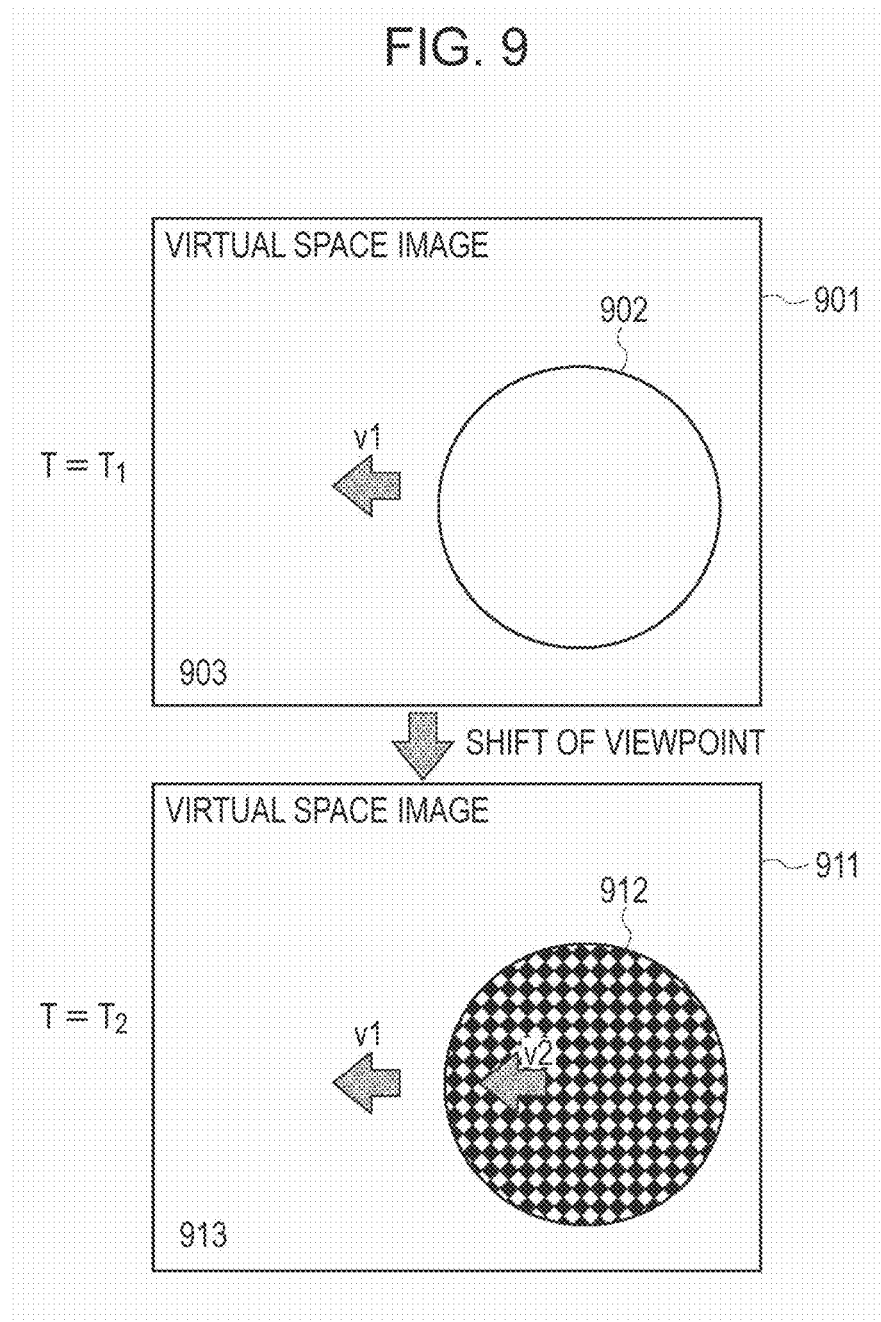

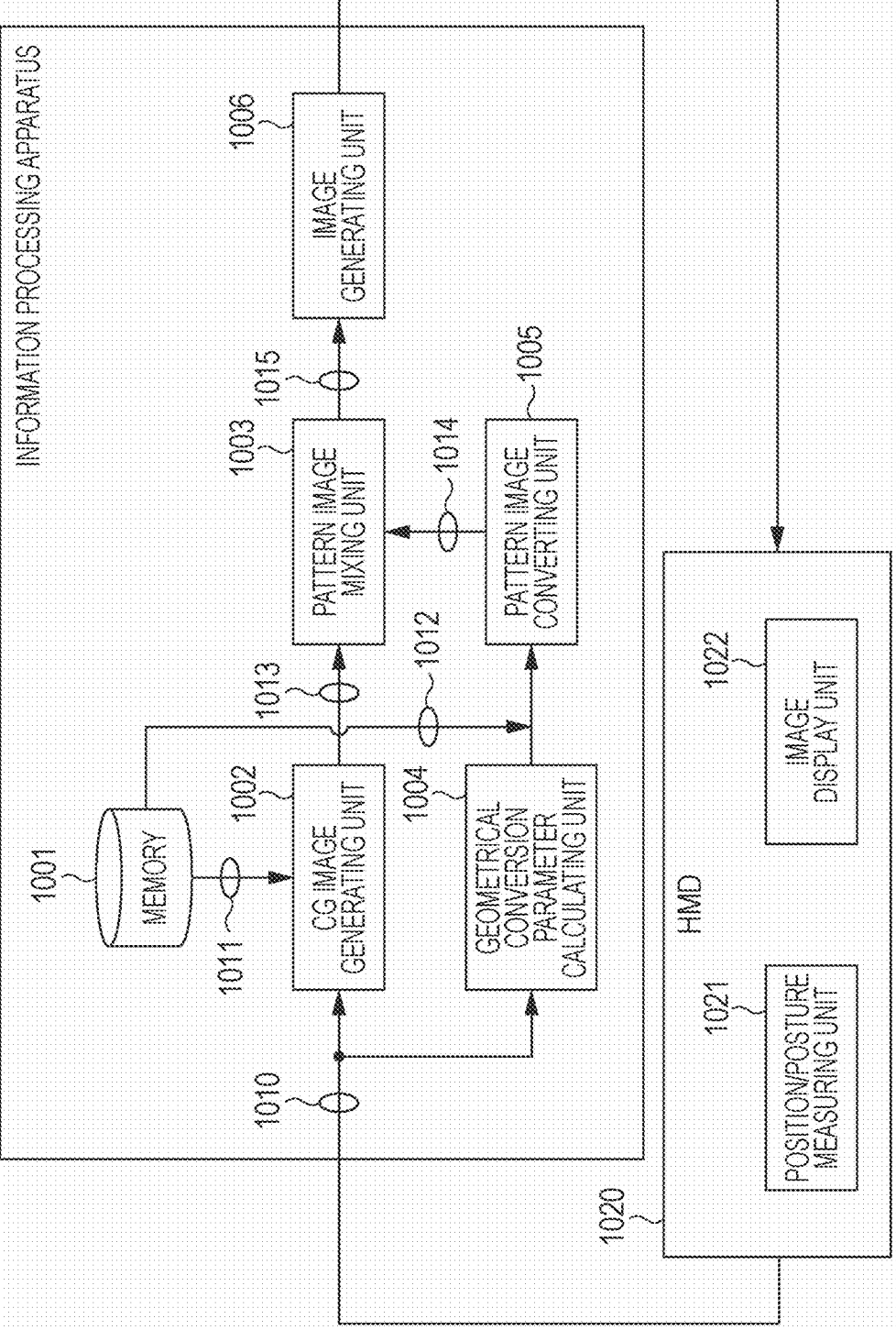

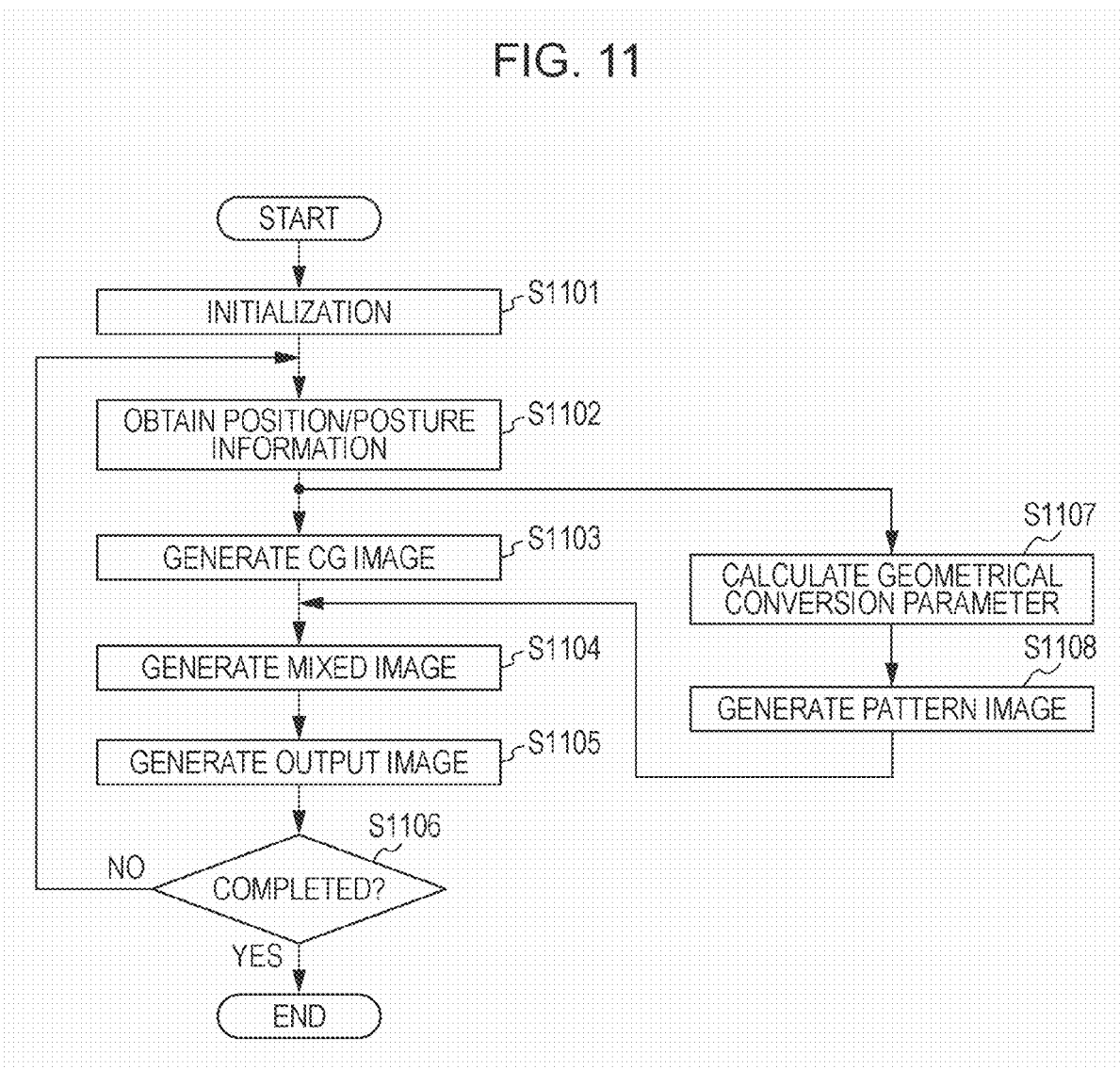

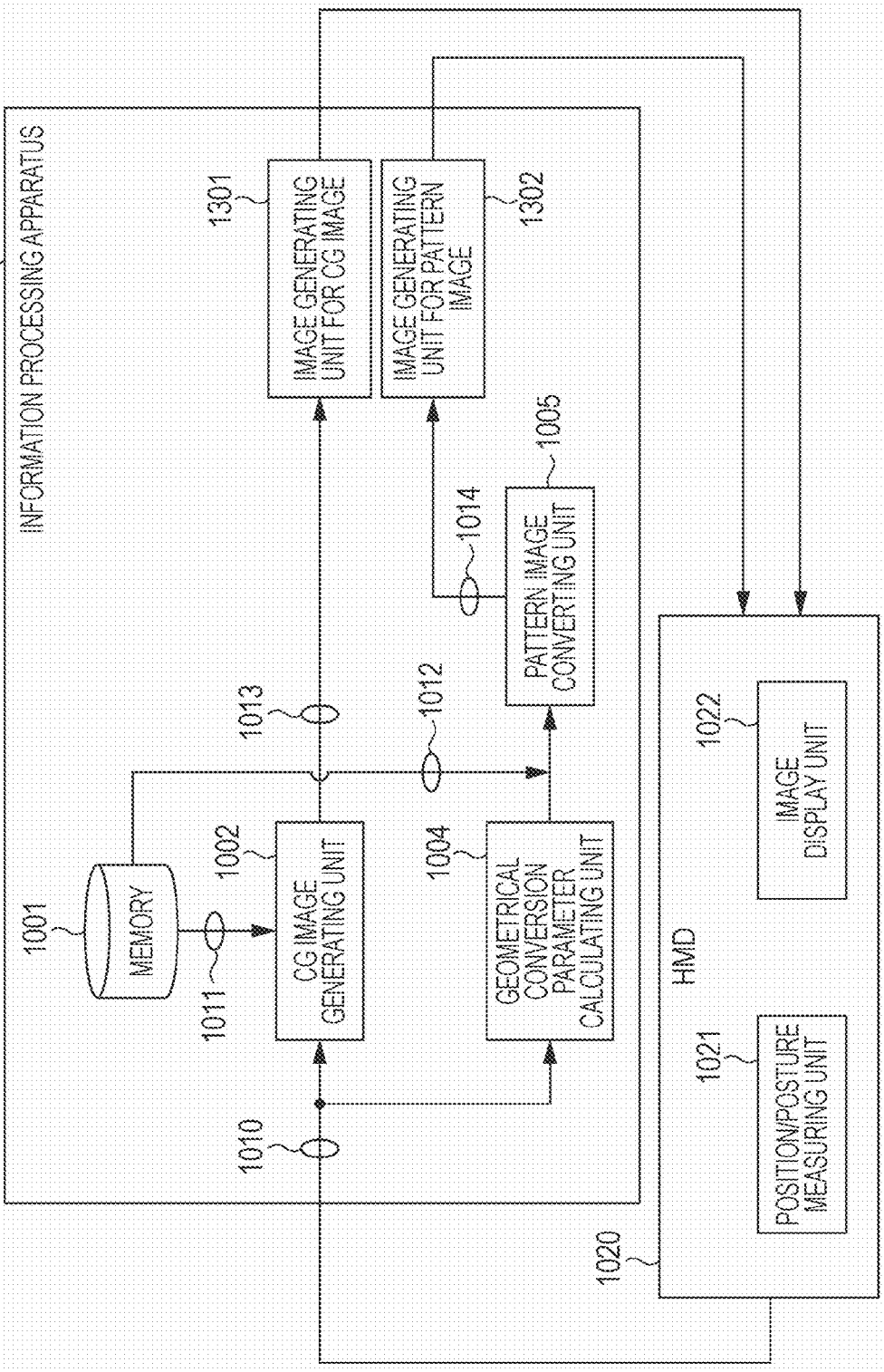

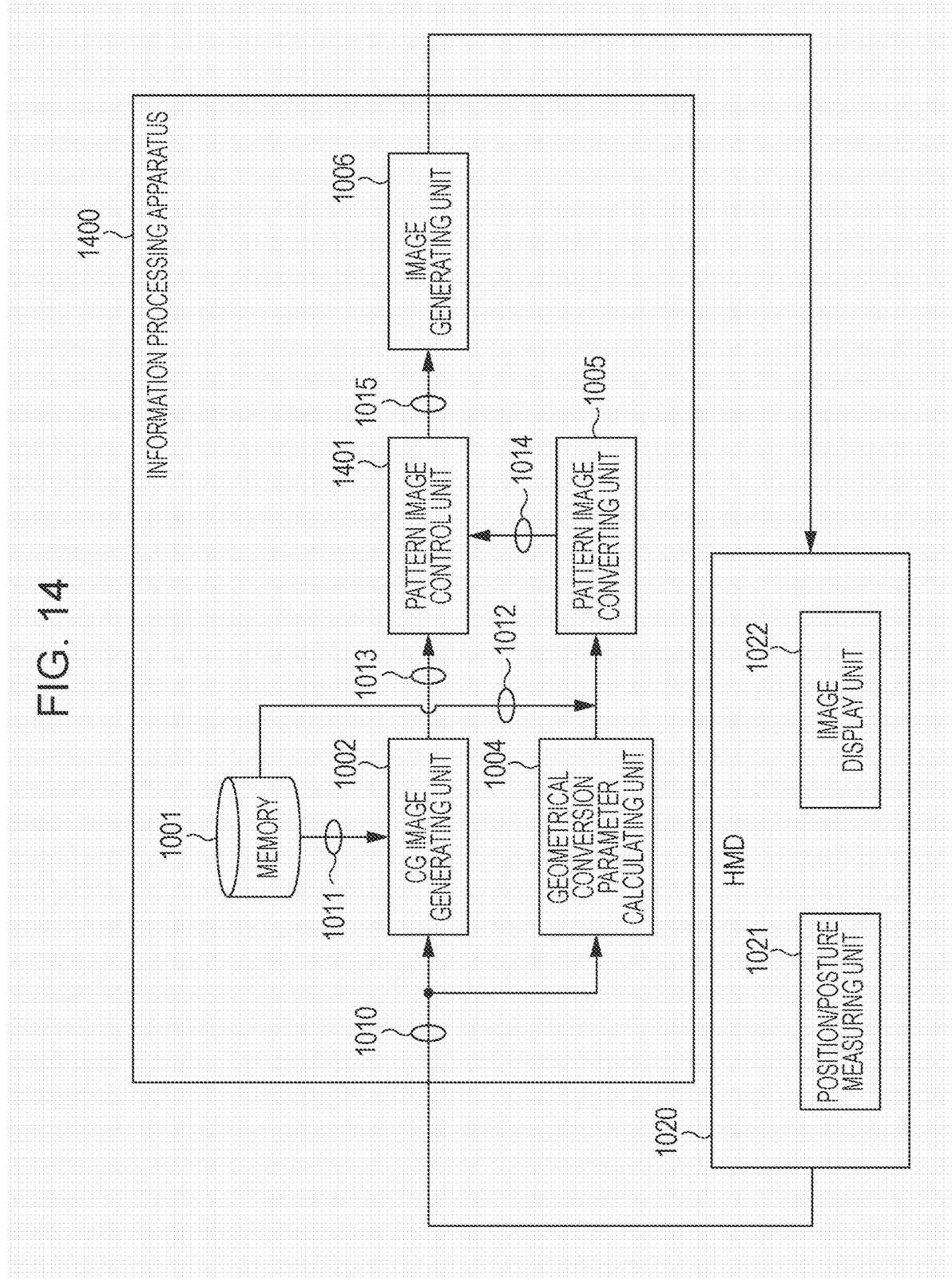

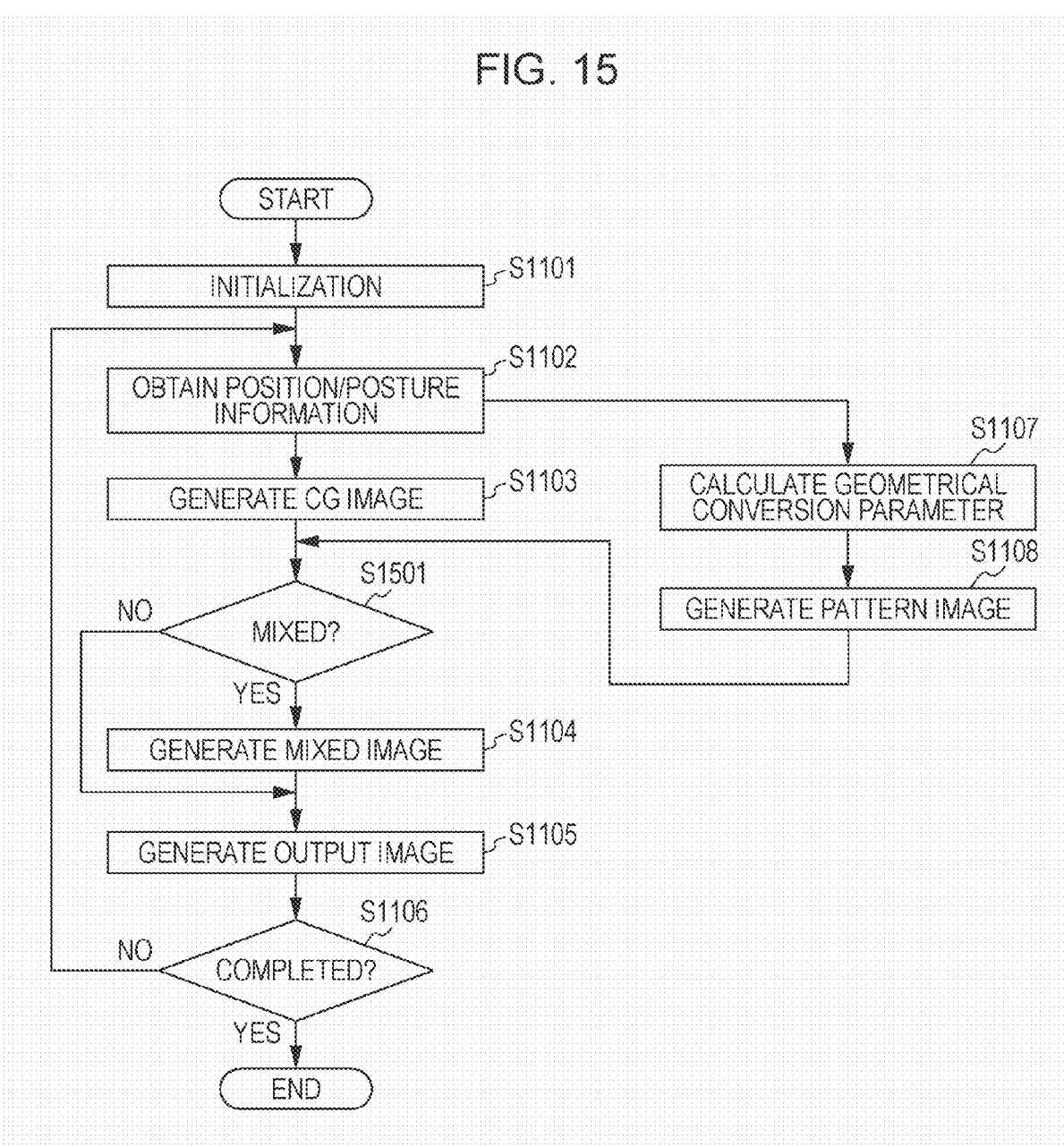

INFORMATION PROCESSING APPARATUS AND INFORMATION PROCESSING METHOD FOR PROCESSING IMAGE INFORMATION AT AN ARBITRARY VIEWPOINT IN A PHYSICAL SPACE OR VIRTUAL SPACE

BACKGROUND OF THE INVENTION

1. Field of the Invention

The present invention relates to an information processing techniques useful in an information processing apparatus configured to process image information at an arbitrary viewpoint in a real (physical) space or a virtual space.

2. Description of the Related Art

Hitherto, it is known that controlling a stimulus given to the human sense of sight, for example, can cause a person to have perception in a state differing from the inherent state.

With the techniques represented by computer graphics (hereinafter abbreviated to "CG"), etc., a virtual object drawn on a two-dimensional plane is displayed as if it exists three-dimensionally, in consideration of human spatial perception characteristics. In the case of CG, perception (e.g., perception representing a three-dimensional object) differing from that corresponding to the inherent state (e.g., a two-dimensionally expressed object) is generated by controlling three-dimensional cues (depth cues), such as shadows, overlaps and texture gradients of virtual objects.

In addition to the CG, stereoscopic display techniques using a random dot stereogram and binocular stereopsis, etc. are also known as similar techniques.

One example of systems utilizing those techniques is a mixed reality system (hereinafter referred to as an "MR system"). The term "MR system" implies a system of generating a virtual space image corresponding to, e.g., the position and the direction of a viewpoint, which are provided based on a real space image, by using the above-mentioned techniques, and by mixing (combining) both the images such that a mixed image of the real space image the virtual space image is displayed to a user.

The MR system enables the user to perceive as if a virtual object actually exists in a real space. Because the virtual space image and the real space image are mixed with each other in the MR system, the MR system is more advantageous than the known virtual reality system (VR system) in that the user can observe a virtual object with an actual size feel.

In the system of displaying the mixed image of the real space image and the virtual space image as in the MR system, a difference occurs in depth perception even when the virtual space image is generated so as to look at an object from a viewpoint in the same position and direction as those of the viewpoint for real space image.

Stated another way, even if the virtual space image is generated based on a virtual object which is prepared such that the viewpoints of the real space and the virtual space have the same position and direction, a difference occurs in depth perception when the generated virtual space image is mixed with the real space image. There are two major reasons why such a phenomenon is caused.

(1) Difference in Depth Cues

The first cause is that different depth cues are displayed for objects having the same depth.

In the MR system, generally, because the virtual space image is generated with rendering of the virtual object based on the viewpoint for the real space image, high matching can be maintained in shape between the virtual object and the real object. However, matching between the virtual object and the real object cannot be maintained in saturation and definition. As a result, a difference occurs in the depth perception. That point will be described in more detail below.

(a) Difference in Depth Perception Caused by Mismatching in Saturation between Real Space Image and Virtual Space Image Usually, a real space image taken by a video camera and a virtual space image generated by the CG differ in saturation because image generating devices differ from each other. Human depth perception characteristics have such a tendency as causing a person to perceive an object with higher saturation as being positioned nearer, and to perceive an object with lower saturation as being positioned farther. In general, the real space image taken by a video camera, for example, has lower saturation than the virtual space image generated by the CG. Therefore, when the virtual object and the real object are positioned at the same distance, the virtual object is perceived as being positioned nearer.

(b) Difference in Depth Perception Caused by Mismatching in Definition between Real Space Image and Virtual Space Image Generally, human depth perception characteristics have such a tendency as causing a person to perceive an object with sharper edges as being positioned nearer, and to perceive an object with a larger blur as being positioned farther. Comparing the virtual space image and the real space image, the virtual space image has sharper edges. Therefore, when the virtual object and the real object are positioned at the same distance, the virtual object is perceived as being positioned nearer.

While the above description is made in connection with the MR system, for example, such a difference in depth perception similarly occurs between an ordinary virtual space image generating system (hereinafter referred to as a "CG system") and a real space image generating system, e.g., a video camera, in addition to the MR system.

(2) Lack of Depth Cues

The second cause is lack of depth cues. The following description is made in connection with, as a concrete example, a system causing a user to experience a three-dimensional image in the MR system or the CG system by using an HMD (Head Mounted Display) or stereoscopic spectacles. In such a system, because of lack of depth cues required for a person to perceive a depth, a difference occurs in depth perception between the real space image and the virtual space image. Herein, the term "depth cues" implies convergence information, focusing (focus adjustment) information, etc.

(a) Difference in Depth Perception Caused by Lack of Convergence Information

One of the depth cues when a person perceives an object is convergence information of an eyeball. In general, when a person sees a near object, outer eye muscles are caused to act for adjustment such that eyeballs are directed inwards and a target to see is positioned at respective centers of the retinas of both the eyeballs. The amounts of actions of the outer eye muscles at that time are taken as the depth cues.

Meanwhile, it is difficult for an image pickup apparatus, e.g., a video camera, to change the position and the direction of the apparatus based on information regarding visual actions of a photographer. Therefore, image information including the convergence information cannot be generated. In other words, the image information generated by the image pickup apparatus lacks the above-mentioned depth cue, i.e., the convergence information, and hence a difference occurs in depth perception between a sensed image and a taken image.

(b) Difference in Depth Perception Caused by Lack of Focusing Information

Another one of the depth cues when a person perceives an object is focusing information. In general, when a person observes an object, ciliary bodies are caused to act to control respective thicknesses of the eye lenses depending on the distance from the eyes to the object for the purpose of focusing. The amounts of actions of the ciliary bodies at that time are taken as the depth cues.

However, when a person observes an object through a display surface of a display apparatus, the focus is always held on the display surface. In other words, the object displayed on the display surface lacks the above-mentioned depth cue, i.e., the focusing information, and hence a difference occurs in depth perception between a sensed image and a taken image.

One conceivable method for eliminating the above-described difference in depth perception is to establish matching between the virtual space image and the real space image in consideration of the depth cues.

Such a method, however, requires steps of analyzing the real space image, obtaining an illumination condition in the real space, human focusing information, etc., and correcting the shape, the saturation and the definition.

Further, the method requires a mechanism for enabling a convergence angle of the display apparatus to be changed, and for changing the convergence angle of the display apparatus based on a value obtained by measuring the state of the human eye balls. Alternatively, the method requires a device for measuring the amounts of actions of the human ciliary bodies, and a mechanism for adjusting a lens based on the measured information. Otherwise, the method requires a mechanism for enabling the position of the display apparatus to be changed, and for controlling the position of the display apparatus based on the amounts of actions of the human ciliary bodies.

However, those constructions inevitably enlarge the system size and increase the cost. Another problem is that, because of a longer processing time, those constructions cannot be applied to a system which requires real time processing. Still another problem is as follows. A difference in depth perception when an object is viewed from a particular position and direction is eliminated by establishing the matching between the real space image and the virtual space image. However, the matching in configuration (shape and size) is lost when the object is viewed from a different position and direction.

As will be understood from the above discussion, there is a demand for a simple method capable of eliminating a difference in depth perception which occurs between image information obtained from an arbitrary viewpoint in a real space and image information obtained from the corresponding arbitrary viewpoint in a virtual space, e.g., a difference in depth perception caused by a difference and/or lack of the depth cues.

SUMMARY OF THE INVENTION

An exemplary embodiment of the present invention provides an information processing apparatus and method for processing image information obtained from an arbitrary viewpoint in a real space or a virtual space, wherein a difference in perception can be avoided from occurring in the image information obtained from the arbitrary viewpoint between the real space and virtual space.

According to an exemplary embodiment of the present invention, in an information processing apparatus configured to generate an image displayed on a display apparatus, the information processing apparatus includes a segmentation unit configured to segment the generated displayed image into a plurality of regions, a generation unit configured to generate a pattern image to be superimposed on one of the plurality of regions or each of the plurality of regions, which have been segmented by the segmentation unit, a superimposition unit configured to superimpose the generated pattern image on one of the plurality of regions or each of the plurality of regions, and an output unit configured to output the displayed image, including the pattern image superimposed thereon, to the display apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 8 is a block diagram illustrating a functional configuration of a pattern image mixing unit when a region is segmented based on distance information.

FIG. 9 illustrates a mechanism for inducing an illusion in user's perception regarding a moving speed of a predetermined object which moves within an MR image.

FIG. 10 is a block diagram illustrating a functional configuration of an information processing apparatus 1000.

FIG. 11 is a flowchart illustrating a processing flow in the information processing apparatus 1000.

FIG. 13 is a block diagram illustrating a functional configuration of an information processing apparatus 1300.

FIG. 14 is a block diagram illustrating a functional configuration of an information processing apparatus 1400.

FIG. 15 is a flowchart illustrating a processing flow in the information processing apparatus 1400.

DESCRIPTION OF THE EMBODIMENTS

Preferred embodiments of the present invention will be described in detail in accordance with the accompanying drawings.

An information processing apparatus in each of the following exemplary embodiments is featured in eliminating a difference in perception by superimposing a predetermined pattern image, which induces an illusion in user's perception, on image information provided to a user.

In other words, the information processing apparatus is featured in eliminating a difference in depth perception, for example, by utilizing an illusion induced in human perception so as to eliminate the difference in the depth perception, which is caused by a difference in or lack of depth cues, without resorting to a method of measuring various physical quantities and without directly correcting displayed image information based on the measured result.

With the method utilizing an illusion induced in human perception, an increase in system size and cost can be avoided because of no necessity of measuring the various physical quantities. Also, because the displayed image information is not corrected, real time viewing is avoided from being impaired. Further, the matching in shape between objects in a real space and in a virtual space is maintained in the displayed image information.

In the following exemplary embodiments, first to sixth ones are described in connection with the case where the information processing apparatus having the features of the present invention is utilized as an MR (Mixed Reality) system in the form combined with an HMD (Head Mounted Display).

Seventh to ninth exemplary embodiments are described in connection with the case where the information processing apparatus is utilized as a CG system. A tenth exemplary embodiment is described in connection with the case where the information processing apparatus is utilized as a reproducing system. Be it noted, however, that applications of the information processing apparatus having the features of the present invention are not limited to those systems.

First Exemplary Embodiment

1. Configuration of MR System

Figure 1:
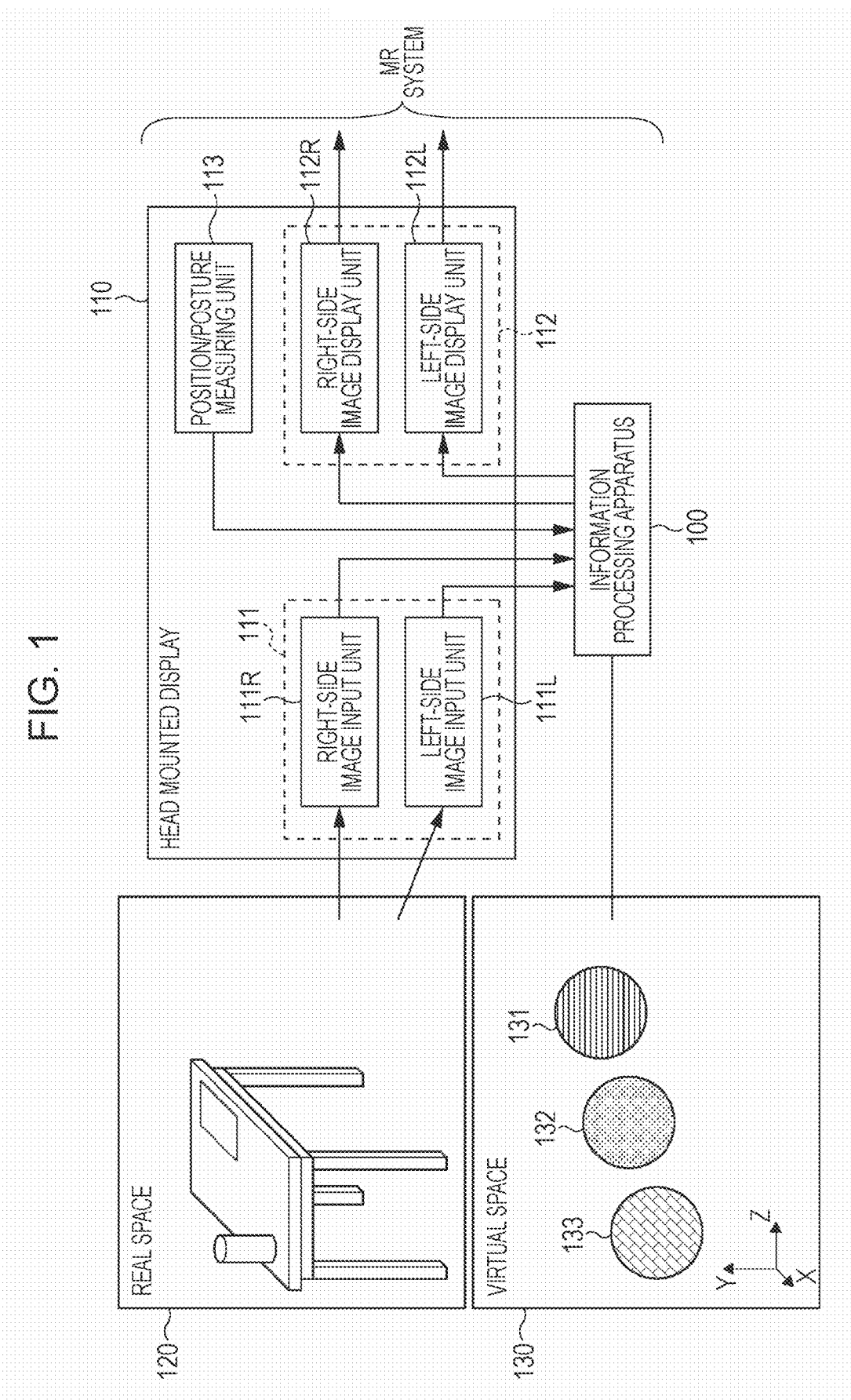
FIG. 1 illustrates an entire configuration of an MR system in combination of an information processing apparatus 100 according to a first exemplary embodiment of the present invention and a HMD.

FIG. 1 illustrates an entire configuration of an MR system in combination of an information processing apparatus 100 according to a first exemplary embodiment of the present invention and an HMD 110.

Referring to FIG. 1, the information processing apparatus 100 generates an MR image (displayed image) by mixing (combining) a real space image obtained by taking an image of a real space 120 and a virtual space image, which is obtained by looking at a virtual object in a virtual space 130 from a predetermined position and direction. Further, the information processing apparatus 100 generates an output image by superimposing, on the generated MR image, a predetermined pattern image which induces an illusion in user's perception. In addition, the information processing apparatus 100 executes control for displaying the generated output image on the HMD 110.

The HMD 110 includes an image input unit 111 for taking an image of the real space 120 and producing a real space image. The image input unit 111 includes a right-side image input unit 111R corresponding to a user's right eye, and a left-side image input unit 111L corresponding to a user's left eye. Real space images generated by the right-side image input unit 111R and the left-side image input unit 111L are input to the information processing apparatus 100.

Also, the HMD 110 includes a position/posture measuring unit 113 for measuring the position and the posture of the HMD 110. Position and posture information of the HMD 110, measured by the position/posture measuring unit 113, is input to the information processing apparatus 100.

Further, the HMD 110 includes an image display unit 112 for displaying the output image generated by the information processing apparatus 100. The image display unit 112 includes a right-side image display unit 112R for displaying the output image to be perceived by the user's right eye, and a left-side image display unit 112L for displaying the output image to be perceived by the user's left eye.

Reference numeral 120 denotes the real space, and reference numeral 130 denotes the virtual space. Reference numerals 131 to 133 denote virtual objects in the virtual space.

2. Functional Configuration of Information Processing Apparatus 100

Figure 2:
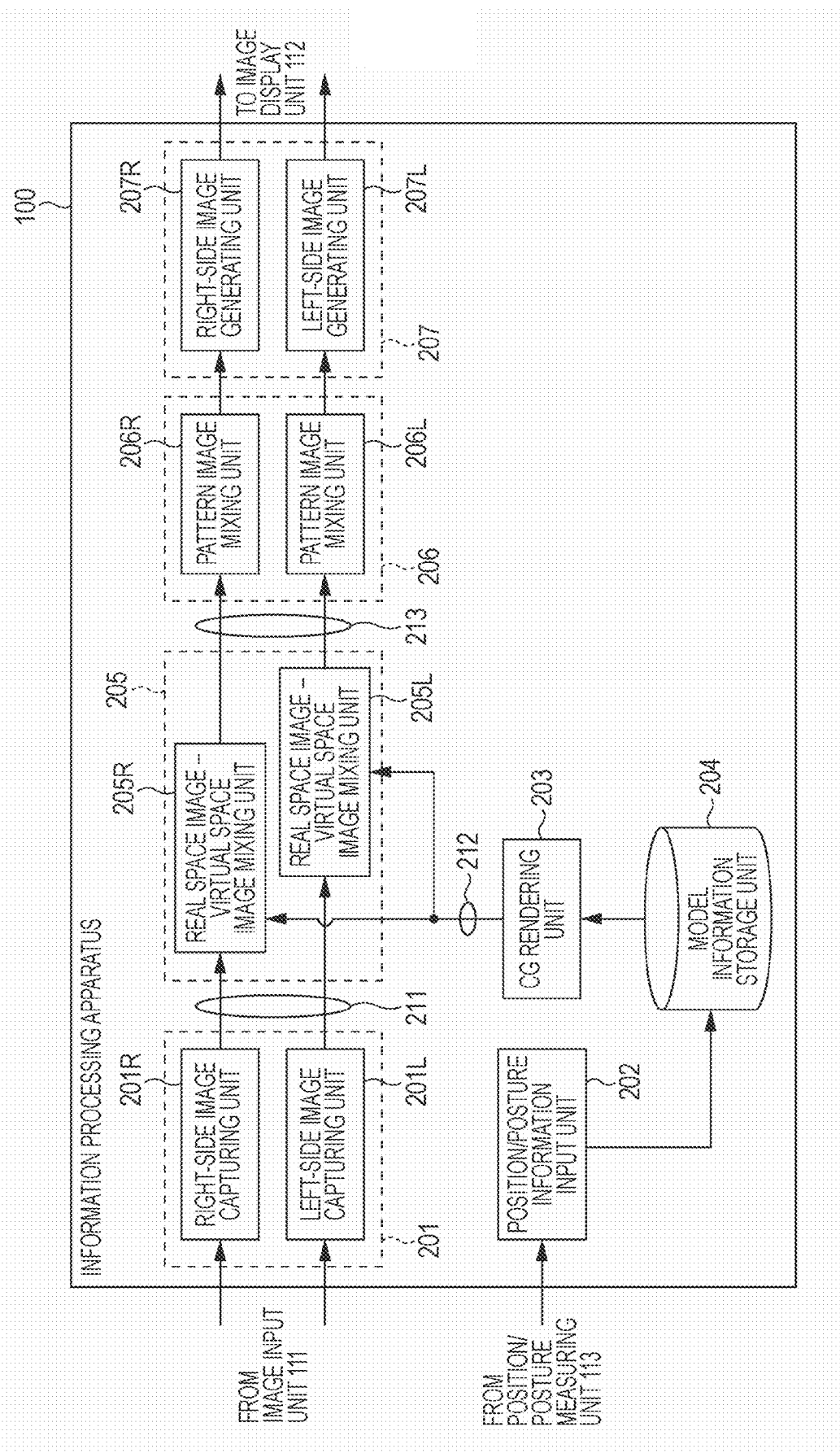
FIG. 2 is a block diagram illustrating a functional configuration of the information processing apparatus 100.

The functional configuration of the information processing apparatus 100 will be described below. FIG. 2 is a block diagram illustrating the functional configuration of the information processing apparatus 100.

Referring to FIG. 2, an image capturing unit 201 takes the real space image, which is input from the image input unit 111 of the HMD 110, into the information processing apparatus 100. The image capturing unit 201 includes a right-side image capturing unit 201R for taking the real space image, which is input from the right-side image input unit 111R, into the information processing apparatus 100. Further, the image capturing unit 201 includes a left-side image capturing unit 201L for taking the real space image, which is input from the left-side image input unit 111L, into the information processing apparatus 100.

A position/posture information input unit 202 takes the position/posture information of the HMD 110, which is input from the position/posture measuring unit 113, into the information processing apparatus 100.

Reference numeral 203 denotes a CG rendering unit. The CG rendering unit 203 calculates, based on the position/posture information having been taken in through the position/posture information input unit 202, the position, posture, size, angle (perspective), etc. of the virtual space image, which is mixed (combined) with the real space image having been taken in through the image capturing unit 201. The virtual space image is generated based on the calculated result.

A modeling information storage unit 204 stores information of the virtual objects 131 to 133, which are present in the virtual space 130 formed by the virtual space image. The CG rendering unit 203 generates a virtual space image 212 based on the position/posture information having been input through the position/posture information input unit 202.

A real space image-virtual space image mixing unit 205 mixes the virtual space image 212 generated by the CG rendering unit 203 with a real space image 211 input through the image capturing unit 201, thus generating an MR image 213. More specifically, the real space image-virtual space image mixing unit 205 includes a real space image-virtual space image mixing unit 205R for mixing the virtual space image with the real space image output from the right-side image capturing unit 201R. Further, the real space image-virtual space image mixing unit 205 includes a real space image-virtual space image mixing unit 205L for mixing the virtual space image with the real space image output from the left-side image capturing unit 201L.

A pattern image mixing unit 206 superimposes a predetermined pattern image, which induces an illusion in user's perception, on the MR image generated by the real space image-virtual space image mixing unit 205. More specifically, the pattern image mixing unit 206 includes a pattern image mixing unit 206R and a pattern image mixing unit 206L for superimposing pattern images on the MR images which have been generated by the real space image-virtual space image mixing units 205R and 205L, respectively.

An image generating unit 207 generates an output image by converting the MR image, which includes the pattern image having been superimposed by the pattern image mixing unit 206, to analog or digital data and then outputs the output image to the image display unit 112 of the HMD 110. More specifically, the image generating unit 207 includes an image generating unit 207R for generating an output image based on the MR image, which includes the pattern image having been superimposed by the pattern image mixing unit 206R. Further, the image generating unit 207 includes an image generating unit 207L for generating an output image based on the MR image, which includes the pattern image having been superimposed by the pattern image mixing unit 206L.

3. Process Until MR Image is Generated

A processing flow executed in the information processing apparatus 100 until generation of the MR image will be described with reference to FIG. 3.

Figure 3:
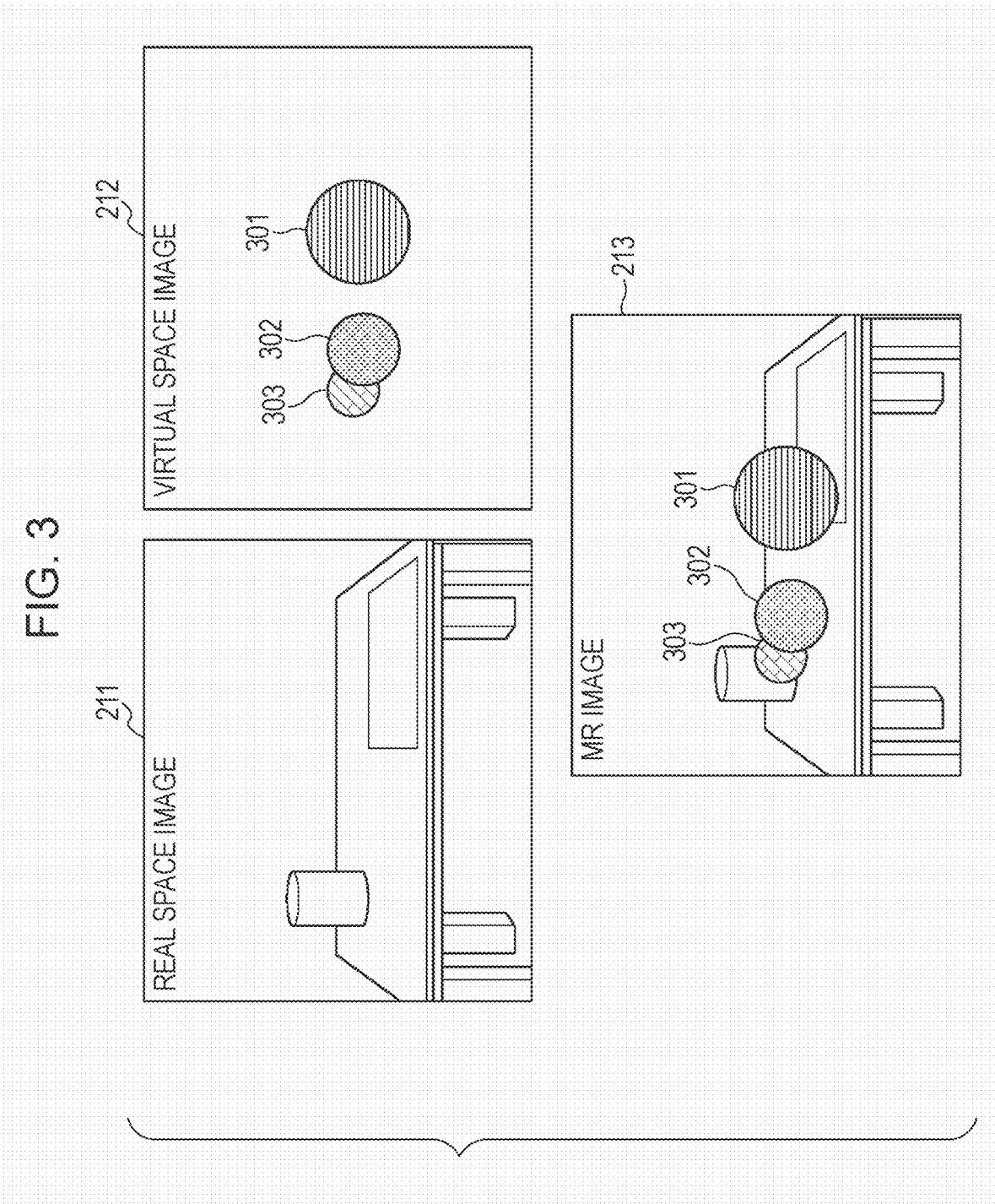
FIG. 3 illustrates a processing flow until an MR image is generated.

Referring to FIG. 3, reference numeral 211 denotes an example of the real space image which has been obtained by taking an image of the real space 120 from the predetermined position and direction through the image input unit 111 of the HMD 110, and which has been taken into the information processing apparatus 100 through the image capturing unit 201.

Reference numeral 212 denotes an example of the virtual space image generated by the CG rendering unit 203 based on the position/posture information that has been obtained with the measurement by the position/posture measuring unit 113 of the HMD 110. Reference numerals 301 to 303 in the virtual space image 212 are virtual object images obtained when looking at the virtual objects 131 to 133 in the virtual space 130 from the predetermined position and direction.

The real space image-virtual space image mixing unit 205 mixes the virtual space image 212 generated by the CG rendering unit 203 with the real space image 211 output from the image capturing unit 201, thus generating an MR image.

Reference numeral 213 denotes an example of the MR image generated by the real space image-virtual space image mixing unit 205. In the MR image 213 generated by the real space image-virtual space image mixing unit 205, the virtual object images 301 to 303 are rendered based on the same viewpoint as that looking at the real space. Therefore, high matching is obtained in the shape (position and size) between the virtual object and the real object. On the other hand, as described above, a difference in depth perception occurs because of low matching in saturation and definition.

4. Functional Configuration of Pattern Image Mixing Unit

To eliminate such a difference in depth perception, in the information processing apparatus 100 according to this exemplary embodiment, a predetermined pattern image inducing an illusion in user's perception is superimposed on the MR image 213 in the pattern image mixing unit 206.

Figure 4:
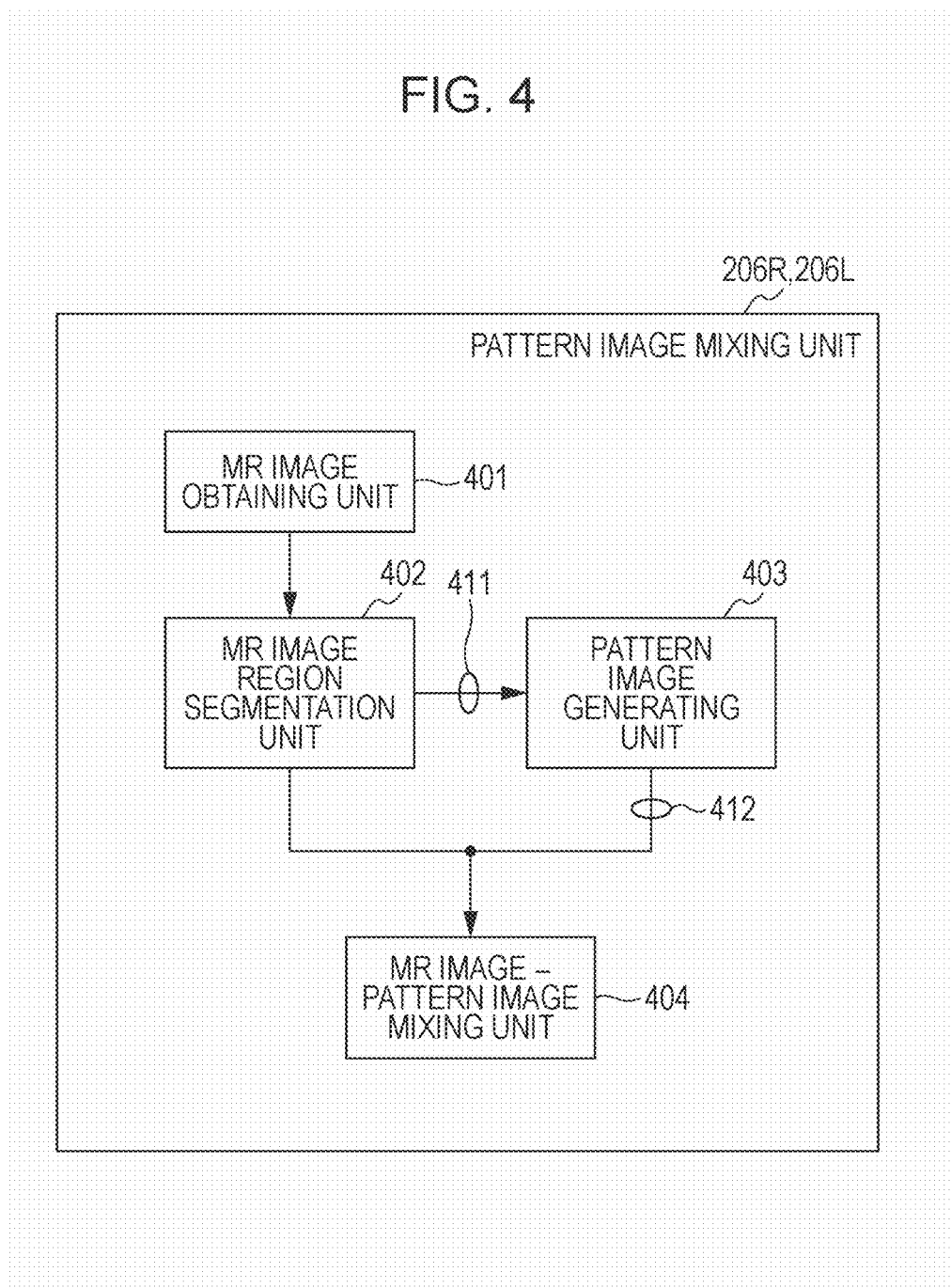
FIG. 4 is a block diagram illustrating a functional configuration of a pattern image mixing unit 206.
Figure 5:
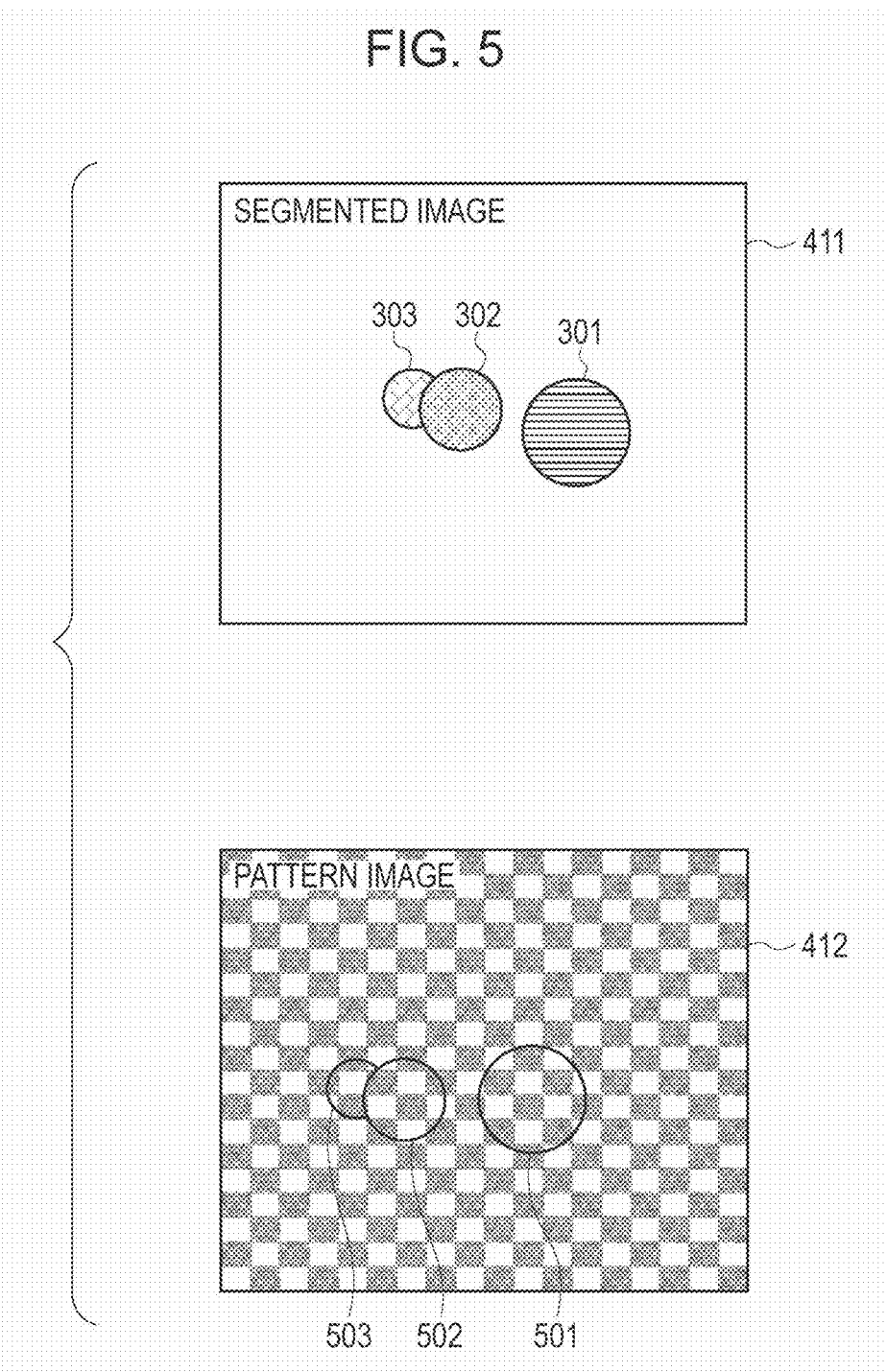
FIG. 5 illustrates a processing flow until a pattern image is generated by the pattern image mixing unit 206.

FIG. 4 is a block diagram illustrating a functional configuration of the pattern image mixing unit 206. FIG. 5 illustrates a processing flow until the pattern image is generated by the pattern image mixing unit 206. The function of the pattern image mixing unit 206 will be described below with reference to FIGS. 4 and 5. While the pattern image mixing unit 206 includes the pattern image mixing units 206R and 206L, the following description is made without discriminating the pattern image mixing units 206R and 206L because they have the same function.

Referring to FIG. 4, an MR image obtaining unit 401 obtains the MR image 213 output from the real space image-virtual space image mixing unit 205.

An MR image region segmentation unit 402 segments the obtained MR image 213 into a plurality of regions and obtains a segmented image 411 including selected regions. The region segmented and selected here is a region where a difference in depth perception occurs, which is to be compensated for by inducing an illusion in user's perception. In this exemplary embodiment, regions defined by the virtual object images 301 to 303 are the regions to be segmented and selected by the MR image region segmentation unit 402.

Reference numeral 411 in FIG. 5 denotes an example of the segmented image obtained by segmenting the MR image with the MR image region segmentation unit 402. In this exemplary embodiment, the segmented image 411 is the same as the virtual space image 212.

A pattern image generating unit 403 generates the predetermined pattern image that induces the illusion in user's perception. The pattern image generating unit 403 recognizes the segmented (and selected) regions based on the segmented image 411 which has been generated by the MR image region segmentation unit 402. Further, the pattern image generating unit 403 generates pattern images suitable for the segmented regions and the other regions such that the generated pattern images are separately superimposed on the segmented regions and the other region (or that the generated pattern image is superimposed only on the segmented regions).

Reference numeral 412 denotes an example of the pattern image generated by the pattern image generating unit 403. In the illustrated example denoted by 412 in FIG. 5, a checker pattern is used as the pattern image. Also, regions 501 to 503 are recognized as the segmented regions. Note that, as denoted by 412 in FIG. 5, the same pattern image is superimposed on both the segmented regions 501 to 503 and the other region.

By selectively superimposing the pattern image on the segmented regions, or by separately superimposing respective pattern images on the segmented regions and the other region, the difference in depth perception can be reduced as a result of inducing the illusion in user's perception.

5. Examples of Pattern Image

Examples of the pattern image 412 generated by the pattern image generating unit 403 will be described below. While the above description is made as using a checker pattern as the pattern image, the pattern image is not limited to the checker pattern and may be modified depending on the nature of the illusion to be induced in user's perception.

Figure 6:
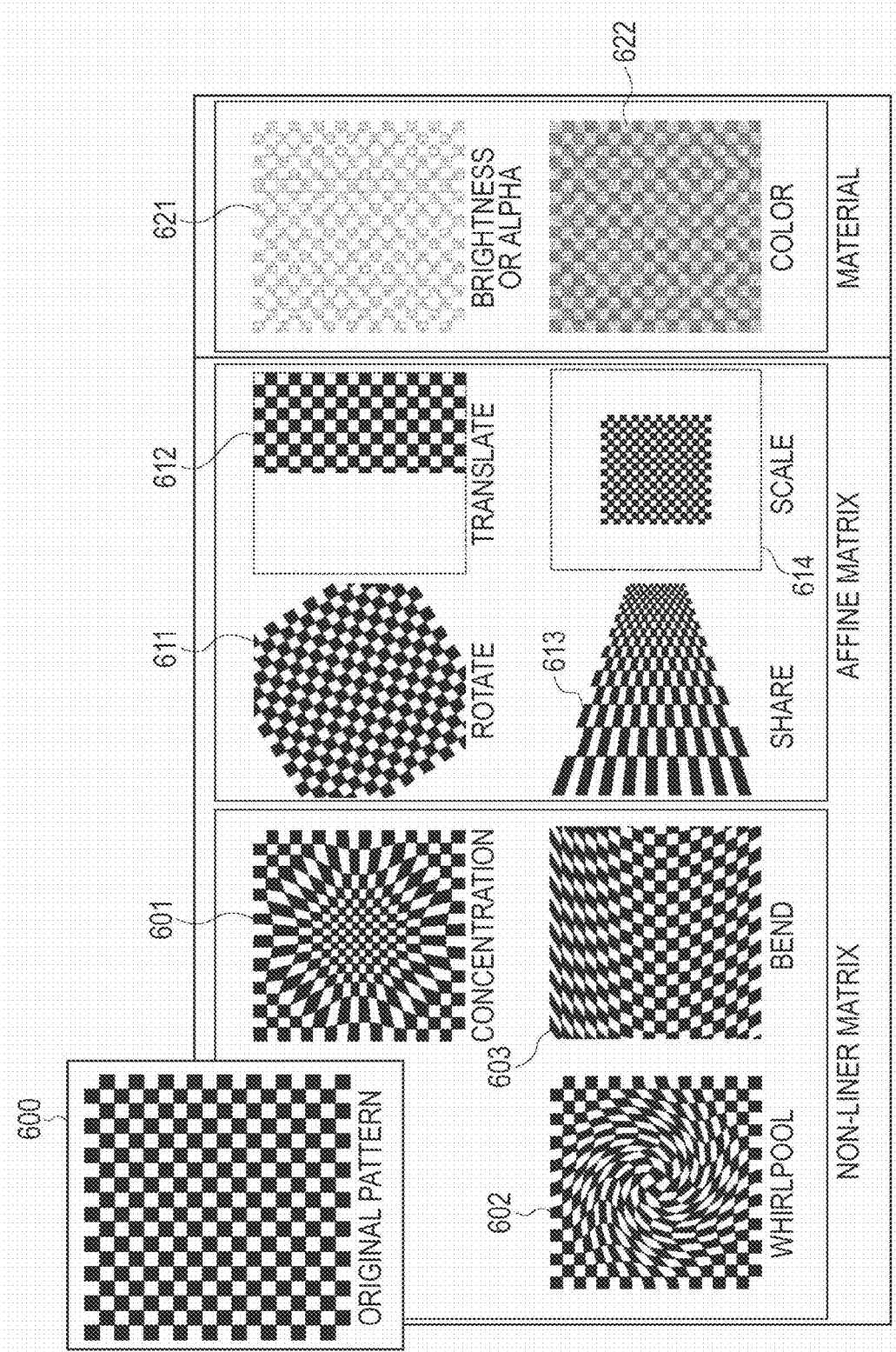
FIG. 6 illustrates examples of a pattern image 412 generated by a pattern image generating unit 403.

FIG. 6 illustrates examples of the pattern image 412 generated by the pattern image generating unit 412. In FIG. 6, reference numeral 600 denotes a checker pattern image as an original pattern image.

Reference numerals 601 to 603 denote pattern images which are obtained by converting the original pattern image 600 by using respective non-linear conversion matrices.

Reference numerals 611 to 613 denote pattern images which are obtained by converting the original pattern image 600 by using respective affine transform matrices.

Reference numerals 621 to 622 denote pattern images which are obtained by converting the original pattern image 600 by using respective material conversion matrices.

Of the above-mentioned examples, the pattern images 601 to 603 ("concentration", "whirlpool", and "bend") are effectively used in the case of causing the user to pay attention to a particular region in the MR image. The pattern images 601 to 603 are generated by executing respectively a concentration conversion process, a whirlpool conversion process, and a shearing deformation conversion process on the original pattern image 600 with a particular point on the MR image being a center.

The pattern image 611 ("rotate") is generated by executing rotation conversion of the original pattern image 600. The sense of equilibrium can be emphasized or suppressed by applying pattern images, which differ in value of the rotation conversion parameter from each other, to a particular region and the other region. In other words, the pattern image 611 is effective in inducing an illusion in an equilibrium sense for a particular region of the MR image.

The pattern images 612 to 614 ("translate", "share", and "scale") are also used in the case of causing the user to pay attention to a particular region in the MR image. The pattern images 612 to 614 are generated by executing a mixing ratio conversion process per pixel, an α-value conversion process in a particular region, a color information conversion process in a particular region, etc.

The pattern image 613 is particularly effective in inducing an illusion in depth perception for a particular region in the MR image. Further, the pattern images 621 and 622 are effective in causing an illusion in brightness (saturation), color, and transparency of a particular region in the MR image.

Thus, various types of pattern images can be generated by converting the original pattern image 600 by using various conversion matrices depending on the nature of the illusion to be induced.

While the examples of FIG. 6 have been described as using the checker pattern image as the original pattern image 600, the scope of the present invention is not limited to the use of the illustrated examples. For example, a random noise pattern image can also be used as the original pattern image.

According to the first exemplary embodiment, as seen from the above description, the pattern image is superimposed on the MR image to induce the illusion in user's perception so that the difference in depth perception occurred between the virtual space image and the real space image in the generated MR image is reduced.

Further, when superimposing the pattern image, a plurality of regions effective in inducing the illusion in user's perception is segmented and the pattern image is selectively superimposed on the segmented regions. As an alternative, pattern images are separately superimposed on the segmented regions and the other region.

As a result, the difference in depth perception in the MR image can be reduced.

Second Exemplary Embodiment

In the above-described first exemplary embodiment, the pattern image is separately superimposed on the segmented regions in each of the generated MR images (i.e., in the MR image corresponding to one frame) for the purpose of reducing the difference in depth perception.

However, the scope of the present invention is not limited to the first exemplary embodiment. For example, the pattern image can also be superimposed, taking into account motions (optical flow) of each object in the MR images covering a plurality of frames.

FIGS. 7A to 7D illustrate examples of the pattern image generated by the pattern image generating unit 403 in the information processing apparatus 100 according to a second exemplary embodiment of the present invention.

Figure 7A:
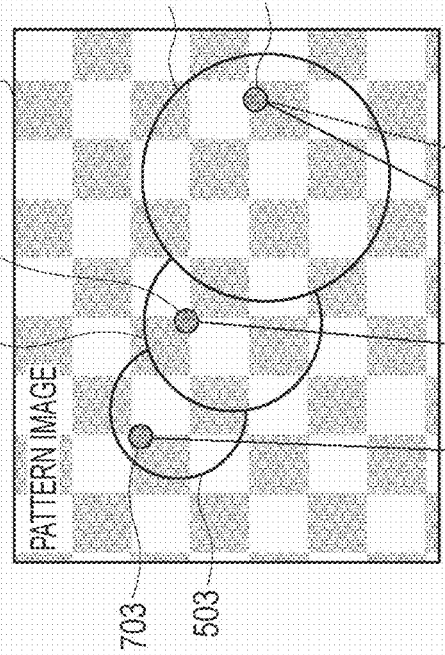
FIGS. 7A to 7D illustrate examples of the pattern image generated by the pattern image generating unit 403 in the information processing apparatus 100 according to a second exemplary embodiment of the present invention.

FIG. 7A illustrates the segmented image 411 at a time T1. Also, FIG. 7B illustrates the segmented image 411 at a time T2. Between the time T1 and the time T2, the virtual object images 301 to 303 in the segmented image 411 appear in different ways depending on a change of the user's viewpoint.

More specifically, the user's viewpoint is moved between the time T1 and the time T2 in such a direction that the virtual object images appear in a more overlapped relation at the time T2. Therefore, virtual object images 311 to 313 at the time T2 appear in a more overlapped relation than the virtual object images 301 to 303 at the time T1.

In other words, the virtual object images 301 to 303 are moved in the MR image to become the virtual object images 311 to 313, respectively, between the time T1 and the time T2. In the illustrated case, the virtual object image located at a position at a shorter distance from (closer to) the user is moved through a larger distance, and the virtual object image located at a position at a longer distance (farther) from the user is moved through a smaller distance.

Figure 7C:
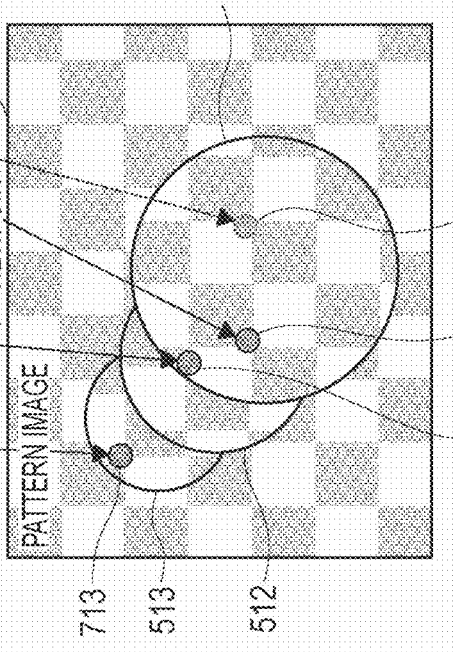
Figure 7B:
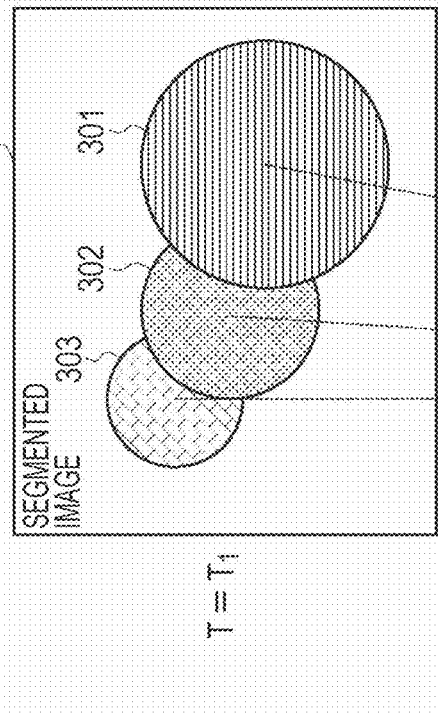
Figure 7D:
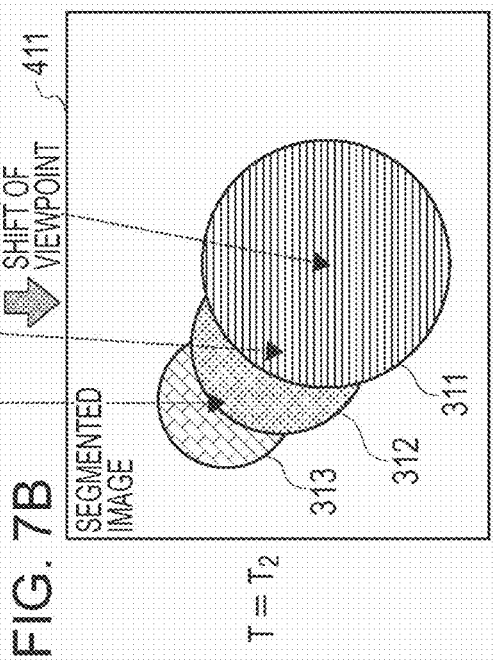

FIGS. 7C and 7D illustrate pattern images generated at T=T1 and T=T2 based on the respective segmented images 411.

In FIG. 7C, a checker pattern image is superimposed on segmented regions (i.e., regions defined by the virtual object images 301 to 303). Further, the same checker pattern image is superimposed on the other region than the segmented regions.

In FIG. 7D, checker pattern images are superimposed on segmented regions (i.e., regions defined by the virtual object images 311 to 313). Further, a checker pattern image is also superimposed on the other region than the segmented regions.

At that time, the same checker pattern image is superimposed on the other region than the segmented regions at the time T1 and the time T2.

On the other hand, different checker pattern images are superimposed on the segmented regions (virtual object images) because the virtual object images are moved between the time T1 and the time T2.

In an example of FIG. 7D, a pattern image is superimposed which can induce such an illusion in user's perception that the distance of movement of the virtual object image 301 appears larger. More specifically, the distance of movement of the pattern image, which is superimposed on the virtual object image 311 at the time T2, relative to the pattern image, which is superimposed on the virtual object image 301 at the time T1, is larger than the distance of movement of the virtual object image itself.

Reference numeral 701 denotes a particular position on the pattern image superimposed on the virtual object image 301. If the distance of movement of the pattern image, which is superimposed on the virtual object image 311 at the time T2, relative to the corresponding pattern image at the time T1 is the same as the distance of movement of the virtual object image 311, the position 701 at the time T1 moves to a position 711 at the time T2.

In contrast, the pattern image is superimposed in this exemplary embodiment such that the position 701 at the time T1 is displayed in a position 711' at the time T2.

On the other hand, the distance of movement of the pattern image, which is superimposed on the virtual object images 312 and 313 at the time T2, relative to the pattern image, which is superimposed on the virtual object image 302 and 303 at the time T1, is the same as the distance of movement of the virtual object image 311 between the time T1 and the time T2. Therefore, the pattern image is superimposed on the virtual object image 312 such that a position 702 thereon at the time T1 is displayed in a position 712 at the time T2. Similarly, the pattern image is superimposed on the virtual object image 313 such that a position 703 thereon at the time T1 is displayed in a position 713 at the time T2.

Thus, by setting the distance of movement of the pattern image superimposed on the virtual object to be larger than the distance of movement of the virtual object image, it is possible to induce an illusion in user's perception that the distance of movement of the pattern image appears to be larger than the actual distance of movement of the virtual object image.

According to the second exemplary embodiment, as seen from the above description, the distance of movement of the pattern image superimposed is set to be larger than that of the corresponding object image so as to induce an illusion in user's perception for motions of objects in the MR images of plural frames.

As a result, the distance of movement of the object image can be made appear larger than the actual distance of movement of thereof in the image space.

Third Exemplary Embodiment

The first and second exemplary embodiments have been described as selectively segmenting the virtual space image from the MR image by the MR image region segmentation unit 402. However, the scope of the present invention is not limited to the described segmentation method.

For example, a distance sensor may be disposed on the HMD 110 to segment, based on distance information output from the distance sensor, a region defined by each of objects within the real space image, which is positioned at a predetermined distance.

FIG. 8 is a block diagram illustrating a functional configuration of a pattern image mixing unit when a region is segmented based on distance information. Note that components having the same functions as those of the pattern image mixing units 206R and 206L, illustrated in FIG. 4, are denoted by the same reference numerals.

Referring to FIG. 8, a feature detecting unit 801 obtains distance information (feature information) sent from the HMD 110. An MR image region segmentation unit 802 discriminates, based on the distance information, a region in an MR image obtained by the MR image obtaining unit 401, which is defined by an object positioned at a predetermined distance, and then segments (selects) the discriminated region.

A pattern image generating unit 803 generates a pattern image that is effective in causing the region, which is defined by the object positioned at the predetermined distance, to appear in an emphasized or suppressed manner.

Accordingly, the region in the MR image, which is defined by the object positioned at the predetermined distance within the real space image, can be displayed so as to appear in an emphasized or suppressed manner.

One example of the distance sensor disposed on the HMD 110 is a range finder, but the distance sensor is not limited to the range finder. The distance information can also be obtained by attaching a marker depending on the distance to a real object, and by reading the marker. As an alternative, the distance information may be obtained by using a plurality of cameras.

Fourth Exemplary Embodiment

In the above-described exemplary embodiments, the pattern image is generated by recognizing the region segmented by the MR image region segmentation unit 402, and by extracting a region of a previously prepared pattern image, which corresponds to the recognized region. The extracted pattern image is superimposed on the corresponding recognized region.

However, the scope of the present invention is not limited to the above-described method. Instead of generating the pattern image in advance, for example, the pattern image may be provided by, after recognizing the segmented region, newly generating a pattern image for each recognized region.

Fifth Exemplary Embodiment

While the third exemplary embodiment has been described above as extracting, as the feature information, the distance information by the feature detecting unit, the scope of the present invention is not limited to the above-described configuration. For example, the configuration may be modified such that brightness information of each pixel within the MR image is extracted as the feature information and the MR image region segmentation unit segments the region based on the extracted brightness information. In this case, different pattern images are superimposed on a bright region and a dark region.

Sixth Exemplary Embodiment

While the foregoing exemplary embodiments have been described in connection with the case of compensating for the difference in depth reception caused in the MR image, the scope of the present invention is not limited to that case. The illusion in user's perception can also be induced with respect to a moving speed of a predetermined object that moves within the MR image.

FIG. 9 illustrates a mechanism for inducing the illusion in user's perception with respect to the moving speed of the predetermined object which moves within an MR image.

In FIG. 9, reference numeral 901 denotes a virtual space image at the time T1, which includes a virtual object image 902. Reference numeral 911 denotes a virtual space image at the time T2, which includes a virtual object image 912.

Referring to FIG. 9, when it is desired to cause a moving speed of the virtual object image 902 to be perceived as being higher than the actual moving speed, a moving speed of the pattern image superimposed on the virtual object image 902 is set higher than a moving speed v1 of the virtual object image 902. Assuming here that a relative speed of the pattern image with respect to the virtual object image 902 is v2, the moving speed of the pattern image within the MR image is provided by (v1+v2), thus presenting an optical flow at a higher speed.

Conversely, when it is desired to cause the moving speed of the virtual object image 902 to be perceived as being lower than the actual moving speed, the moving speed of the pattern image superimposed on the virtual object image 902 is set lower than the moving speed v1 of the virtual object image 902. By setting the relative speed v2 of the pattern image with respect to the virtual object image 902 to a negative value, the user is forced to perceive the moving speed of the virtual object image 902 as being lower than the actual moving speed.

While the above description is made as changing the moving speed of the pattern image corresponding to the segmented regions (virtual object images) 902 and 912, the scope of the present invention is not limited to the above-described method. For example, the pattern image superimposed on regions 903 and 913 (in the virtual space image) other than the segmented regions 902 and 912 may be moved stead.

In such a modification, the user is forced to perceive the moving speed of the segmented region as being lower than the actual moving speed by moving the pattern image, which is superimposed on the region other than the segmented region, in the same direction as the moving direction of the segmented region. Also, the user is forced to perceive the moving speed of the segmented region as being higher than the actual moving speed by moving the pattern image, which is superimposed on the region other than the segmented region, in a direction opposed to the moving direction of the segmented region.

Seventh Exemplary Embodiment

The first exemplary embodiment has been described above as reducing the difference in depth perception, which is possibly caused even when the MR image is generated without a delay based on the position/posture information obtained by the position/posture measuring unit 113 of the HMD 110. However, the scope of the present invention is not limited to the configuration of the first exemplary embodiment.

In general, when the MR image is generated based on the position/posture information obtained by the position/posture measuring unit 113 of the HMD 110, a high processing load is imposed on the CG rendering unit 203 and the real space image-virtual space image mixing unit 205.

Therefore, a delay may occur in the output image, which is output from the image generating unit 207, relative to the motion of the HMD 110.

In view of such a delay, a seventh exemplary embodiment provides a scheme for making the delay of the output image, which is output from the image generating unit 207, less visually recognizable by utilizing the effect of inducing the illusion in user's perception, which is obtained by superimposing the pattern image.

While the exemplary embodiments have been described above as superimposing the pattern image on the MR image, the following exemplary embodiments, including the seventh exemplary embodiment, will be described in connection with the case of superimposing the pattern image on a CG image.

1. Functional Configuration of Information Processing Apparatus

FIG. 10 is a block diagram illustrating a functional configuration of a CG system to which an information processing apparatus 1000 according to the seventh exemplary embodiment is applied. In FIG. 10, a CG image generating unit 1002 processes virtual data 1011, read from a memory 1001, based on position/posture information 1010 sent from a position/posture measuring unit 1021 of an HMD 1020. Further, the CG image generating unit 1002 generates a CG image 1013 corresponding to the position and the direction of the user's viewpoint.

A geometrical conversion parameter calculating unit 1004 calculates the direction and the distance of movement of the user's viewpoint based on the position/posture information 1010 sent from the position/posture measuring unit 1021 of the HMD 1020. A pattern image converting unit 1005 executes translation conversion on a pattern image 1012, read from the memory 1001, based on the direction and the distance of movement of the user's viewpoint, which have been calculated by the geometrical conversion parameter calculating 1004.

A pattern image mixing unit 1003 superimposes a pattern image 1014, which has been subjected to the translation conversion in the pattern image converting unit 1005, on the CG image 1013 generated by the CG image generating unit 1002. The superimposition of the translated pattern image serves to compensate for the optical flow when a delay occurs in the process of generating the CG image.

An image generating unit 1006 generates an output image by converting the CG image, which includes the pattern image having been superimposed in the pattern image mixing unit 1003, to analog or digital data, and then outputs the output image to an image display unit 1022 of the HMD 1020.

2. Processing Flow in Information Processing Apparatus

A processing flow in the information processing apparatus 1000 will be described below with reference to FIG. 11. FIG. 11 is a flowchart illustrating the processing flow in the information processing apparatus 1000.

After executing initialization in step S1101, the position/posture information 1010 is obtained in step S1102.

In step S1103, the CG image 1013 is generated based on the obtained position/posture information 1010. In parallel, a geometrical conversion parameter is calculated in step S1107, and the pattern image 1012 is subjected to the translation conversion in step S1107 based on the calculated geometrical conversion parameter.

In step S1104, the pattern image 1012 having been subjected to the translation conversion is superimposed on the generated CG image 1013. Further, in step S1105, the image generating unit 1006 generates an output image and outputs the generated output image.

In step S1106, it is determined whether the end of processing is instructed. If it is determined that the end of processing is not instructed, the processing is returned to step S1102 to obtain the position/posture information 1010 again.

Thereafter, the processing from the step S1102 to the step S1108 is repeated at a predetermined cycle until it is determined in step S1106 that the end of processing is instructed.

If it is determined in step S1106 that the end of processing is instructed, the processing is brought to an end.

3. Concrete Example of Processing in Information Processing Apparatus

A concrete example of the processing in the information processing apparatus 1000 will be described below with reference to FIG. 12.

Figure 12:
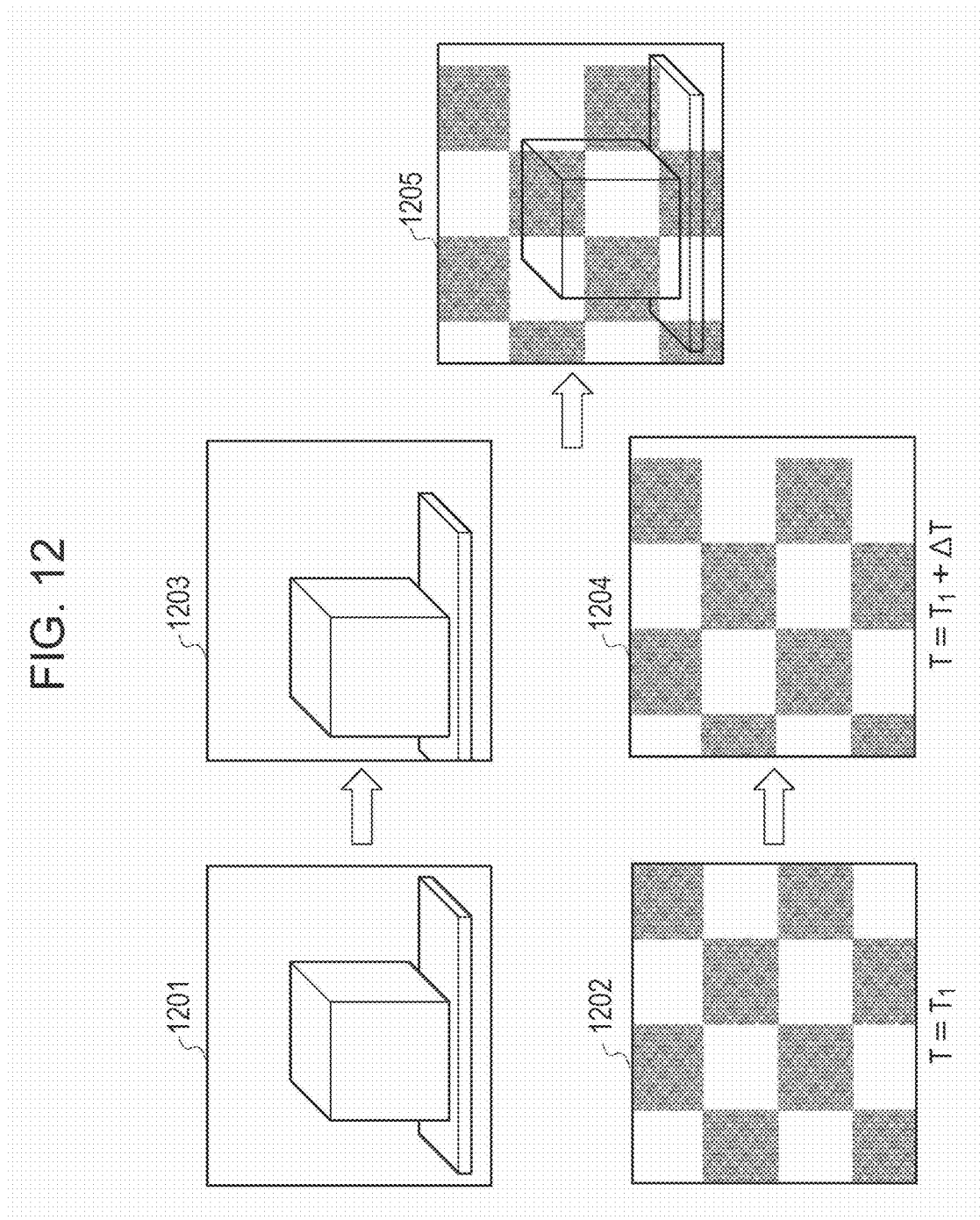
FIG. 12 illustrates a concrete example of processing in the information processing apparatus 1000.

In FIG. 12, reference numeral 1201 illustrates an example of a CG image generated based on the position/posture information obtained at the time T1. Reference numeral 1202 illustrates a pattern image generated based on the position/posture information.

Reference numeral 1203 illustrates a CG image to be generated based on the position/posture information obtained at a time (T1+ΔT).

Reference numeral 1204 illustrates a pattern image generated based on the position/posture information obtained at the time (T1+ΔT) after executing translation conversion of the pattern image 1202 such that the pattern image 1202 is translated through a distance equivalent to the amount of an optical flow during a period of ΔT.

Herein, the CG image generating unit 1002 is required to generate the CG image 1203 until the period of ΔT lapses from the generation of the CG image 1201. Nevertheless, it is now assumed that the CG image 1203 cannot be generated until the lapse of ΔT because of a delay in processing.

In that case, the CG image 1203 is not yet generated at the time just after the lapse of ΔT. Therefore, the pattern image mixing unit 1003 superimposes the pattern image 1204 on the CG image 1201 before one cycle (see 1205). Stated another way, when the optical flow of the CG image cannot follow the operation of the HMD 1020, the influence of the delay occurred in the process of generating the CG image is reduced by superimposing the pattern image, which is generated depending on the amount of the optical flow of the CG image during one cycle, on the CG image before one cycle.

Thus, according to the seventh exemplary embodiment, the output image output from the image generating unit 1007 can be displayed so as to appear with no delay in the output image by utilizing the effect of an illusion in user's perception, which is produced by superimposing the pattern image.

While the seventh exemplary embodiment is illustrated as using a checker pattern as the pattern image, the scope of the present invention is not limited to the use of the checker pattern. Another suitable pattern image, e.g., a random dot noise pattern, can also be used as a matter of course.

Further, while the seventh exemplary embodiment has been described in connection with the case of using the translation conversion as the geometrical conversion, the scope of the present invention is not limited to the use of the translation conversion. Another suitable geometrical conversion can also be of course used so long as the geometrical conversion can execute correction to provide the desired optical flow.

One example of the other geometrical conversions is executed by detecting the direction of gravitation from information obtained with a sensor for measuring the terrestrial magnetism, such as a gyro, and by performing rotation conversion based on the detected information such that an object is guided to incline in the direction of gravitation with respect to a current posture of the object. Another example is non-linear conversion executed by using an acceleration sensor and correcting the position of an object based on an acceleration component detected by the acceleration sensor at a current position of the viewpoint.

Eighth Exemplary Embodiment

While the seventh exemplary embodiment has been described above as superimposing the pattern image on the CG image in the pattern image mixing unit, the scope of the present invention is not limited to the above-described configuration. The CG image and the pattern image may be separately output to the image display unit because there is a deviation between the timing of generating the CG image and the timing of generating the pattern image.

FIG. 13 is a block diagram illustrating a functional configuration of a CG system to which an information processing apparatus 1300 according to an eighth exemplary embodiment is applied. In FIG. 13, components having the same functions as those in FIG. 10 are denoted by the same reference numerals.

The CG system of FIG. 13 differs from that of FIG. 10 in not including the pattern image mixing unit 1003, but including an image generating unit 1301 for the CG image and an image generating unit 1302 for the pattern image. Respective output images of the image generating units 1301 and 1302 are output to the image display unit 1022.

In the functional configuration of FIG. 13, the image display unit 1022 is configured to be able to display two output images at different update rates.

Ninth Exemplary Embodiment

While the pattern image is displayed at all times in the seventh exemplary embodiment, the scope of the present invention is not limited to the above-described configuration. For example, the configuration may be modified such that only when the moving speed of the object is changed, the corresponding pattern image is displayed, and when the object is in a standstill state, no pattern image is displayed.

FIG. 14 is a block diagram illustrating a functional configuration of a CG system to which an information processing apparatus 1400 according to a ninth exemplary embodiment is applied. In FIG. 14, components having the same functions as those in FIG. 10 are denoted by the same reference numerals.

The CG system of FIG. 14 differs from that of FIG. 10 in including a pattern image control unit 1401 instead of the pattern image mixing unit 1003. When the pattern image 1014 generated by the pattern image converting unit 1005 is superimposed on the CG image 1013, the pattern image control unit 1401 executes control such that the pattern image 1014 is superimposed on the CG image 1013 only when the position/posture information 1010 is changed.

FIG. 15 is a flowchart illustrating a processing flow in the information processing apparatus 1400 according to the ninth exemplary embodiment. In FIG. 15, steps of executing the same processes as those in FIG. 11 are denoted by the same reference numerals.

The flowchart of FIG. 15 differs from that of FIG. 11 in determining, in step S1501, whether the pattern image generated in step S1108 is to be superimposed on the CG image before both the images are actually superimposed one above the other in step S1104.

More specifically, in step S1501, it is first determined whether the position/posture information obtained in step S1002 is changed from the position/posture information having been obtained before one cycle. If the change of the position/posture information is determined, it is then determined in step S1501 that the generated pattern image is to be superimposed on the CG image. Thereafter, the processing is advanced to step S1004.

On the other hand, in step S1501, if the change of the position/posture information is not determined, it is then determined that the generated pattern image is not to be superimposed on the CG image. Thereafter, the processing is advanced to step S1005.

With the information processing apparatus according to the ninth exemplary embodiment, as will be seen from the above description, when the HMD 1020 is in the standstill state, the pattern image is not superimposed on the CG image. In other words, by executing control such that the pattern image is not superimposed on the CG image when the HMD 1020 is in the standstill state, deterioration in quality of the output image attributable to the superimposition of the pattern image can be avoided in the standstill state.

Additionally, when the viewpoint is changed, the user cannot visually recognize the CG image in details. Therefore, even when the pattern image is superimposed on the CG image during movement, a resulting influence, i.e., resulting deterioration in quality of the output image, is small.

Tenth Exemplary Embodiment

While the seventh to ninth exemplary embodiments have been described above as applying the information processing apparatus of the exemplary embodiment to the CG system, the scope of the present invention is not limited to that application.

For example, the information processing apparatus of the exemplary embodiment can also be applied to a system for reproducing a video image taken by a handy video apparatus while it is held by the user's hand(s), in particular, to such a reproducing system when a vide image having relatively large motion blurs caused by hand shakes is reproduced.

Concretely, gyro information included in the handy video apparatus, for example, is recorded along with the video image. When the recorded video image is reproduced by the reproducing system, the pattern image is generated based on the gyro information and is superimposed on a reproduced image.

As a result, motion blurs of the video image, not intended by the user, can be reduced.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2008-195311 filed Jul. 29, 2008, which is hereby incorporated by reference herein in its entirety.

What is claimed is:

1. An information processing apparatus comprising:
a memory;
a processor coupled to the memory which executes the following:
inputting an image;
detecting a position and orientation of a display apparatus worn by a user;
extracting a region from the image;
determining a pattern image to be superimposed onto the extracted region, based on the detected position and orientation;
superimposing the pattern image on the region extracted; and
outputting a displayed image, including the pattern image superimposed thereon, to the display apparatus,
wherein an amount of movement of the pattern image to be superimposed is different from an amount of movement of the extracted region on which the pattern image is to be superimposed, between frames of the pattern image superimposed on the region arranged in a direction of time.

2. The information processing apparatus according to claim 1, wherein the region extracted from the image includes a virtual object.

3. The information processing apparatus according to claim 1, wherein the region extracted from the image is defined by an object which is positioned at a preset distance in a depth direction.

4. The information processing apparatus according to claim 1, wherein the region extracted from the image is defined by an object which is to be viewed by a user with attention.

5. The information processing apparatus according to claim 1, wherein the region extracted from the image is defined by an object for which image information is changed.

6. The information processing apparatus according to claim 1, wherein the determining determines the pattern image by executing conversion on a preset pattern image.

7. The information processing apparatus according to claim 1, further comprising a storage unit configured to store the pattern image,
wherein the superimposing reads the pattern image determined and stored in the storage unit and superimposes the read pattern image on one of a plurality of regions or each of the plurality of regions.

8. The information processing apparatus according to claim 1, wherein the determining determines different pattern images for a plurality of regions.

9. The information processing apparatus according to claim 1, wherein the display apparatus is a head mounted display apparatus.

10. The apparatus according to claim 1, wherein the amount of movement of the pattern image to be superimposed is larger than the amount of movement of the extracted region on which the pattern image is to be superimposed.

11. An information processing method for use in an information processing apparatus, the information processing method comprising the steps of:
inputting an image;
detecting a position and orientation of a display apparatus worn by a user;
extracting a region from the image;
determining a pattern image to be superimposed onto the extracted region, based on the detected position and orientation;
superimposing the pattern image on the extracted region; and
outputting a displayed image, including the pattern image superimposed thereon, to the display apparatus,
wherein an amount of movement of the pattern image to be superimposed is different from an amount of movement of the extracted region on which the pattern image is to be superimposed, between frames of the pattern image superimposed on the region arranged in a direction of time.

12. A non-transitory computer readable storage medium storing a program which causes a computer to execute the information processing method according to claim 11.

\* \* \* \* \*